United States Patent
Kobayashi et al.

(10) Patent No.: US 8,424,909 B2
(45) Date of Patent: Apr. 23, 2013

(54) GAS GENERATOR FOR RESTRAINING DEVICE OF VEHICLE

(75) Inventors: Tomoharu Kobayashi, Tatsuno (JP); Naoki Matsuda, Tatsuno (JP); Osamu Fukawatase, Toyota (JP); Tomoko Kurata, Tsuchiura (JP); Yuki Nonoyama, Kiyosu (JP); Tadashi Yamada, Kiyosu (JP); Toru Ozaki, Kiyosu (JP)

(73) Assignees: Daicel Chemical Industries, Ltd., Tokyo (JP); Toyota Jidosha Kabushiki Kaisha, Toyota-Shi, Aichi (JP); Toyoda Gosei Co., Ltd, Kiyosu-Shi, Aichi (JP)

(*) Notice: Subject to any disclaimer, the term of this patent is extended or adjusted under 35 U.S.C. 154(b) by 21 days.

(21) Appl. No.: 13/059,729

(22) PCT Filed: Jan. 14, 2010

(86) PCT No.: PCT/JP2010/050660
§ 371 (c)(1),
(2), (4) Date: Apr. 28, 2011

(87) PCT Pub. No.: WO2010/082680
PCT Pub. Date: Jul. 22, 2010

(65) Prior Publication Data
US 2011/0253000 A1 Oct. 20, 2011

(30) Foreign Application Priority Data
Jan. 15, 2009 (JP) .................................. 2009-6742

(51) Int. Cl.
*B60R 21/26* (2006.01)
(52) U.S. Cl.
USPC ............................ 280/741; 280/736; 102/530
(58) Field of Classification Search .................. 102/530; 280/736, 741
See application file for complete search history.

(56) References Cited

U.S. PATENT DOCUMENTS 4,296,084 A * 10/1981 Adams et al. ................. 423/351
5,048,862 A    9/1991 Bender et al.
(Continued)

FOREIGN PATENT DOCUMENTS

CN    101041345 A    9/2007
DE    198 12 221 A1    9/1998
(Continued)

OTHER PUBLICATIONS

Chinese Office Action issued in Chinese Patent Application No. 201080002346.5 on Oct. 17, 2012.
(Continued)

*Primary Examiner* — Daniel J Troy
(74) *Attorney, Agent, or Firm* — Birch, Stewart, Kolasch & Birch, LLP

(57) ABSTRACT

A gas generator includes: a housing having closure and diffuser shells; an inner tube member accommodating an igniter, an opening end of the inner tube member being located opposing a bottom plate of the closure shell and defining a ventilating portion formed at the opening end,
the inner tube member being fixed to an igniter attaching portion, and having a cylindrical portion projecting inwardly in the closure shell, and a passage being formed between the inner tube member and the igniter attaching portion to reach the ventilating portion;
an outer circumference cylindrical member provided in the combustion chamber and one end opening thereof being located at the bottom plate; and
an annular porous member defining a space above the combustion chamber,
the space being communicated to a gas discharge path defined between the outer circumference cylindrical member and a side surface of the diffuser shell through a communicating portion.

4 Claims, 4 Drawing Sheets

U.S. PATENT DOCUMENTS

| | | |
|---|---|---|
| 5,087,070 A | 2/1992 | O'Loughlin et al. |
| 5,458,371 A | 10/1995 | Fulmer et al. |
| 5,564,741 A | 10/1996 | Ward et al. |
| 5,582,427 A | 12/1996 | Rink et al. |
| 5,951,040 A | 9/1999 | McFarland et al. |
| 5,984,352 A | 11/1999 | Green, Jr. et al. |
| 6,126,197 A | 10/2000 | Muir et al. |
| 6,142,515 A | 11/2000 | Mika |
| 6,227,565 B1 | 5/2001 | McFarland et al. |
| 6,234,521 B1 | 5/2001 | Katsuda et al. |
| 6,942,249 B2 | 9/2005 | Iwai et al. |
| 7,591,483 B2 | 9/2009 | Nakayasu et al. |
| 7,600,783 B2 | 10/2009 | Numoto et al. |
| 7,763,092 B2 | 7/2010 | Koyama et al. |
| 7,806,954 B2 | 10/2010 | Quioc |
| 2003/0051630 A1 | 3/2003 | Katsuda et al. |
| 2003/0137139 A1 | 7/2003 | Iwai et al. |
| 2004/0155444 A1 | 8/2004 | Matsuda et al. |
| 2005/0001414 A1 | 1/2005 | Matsuda et al. |
| 2007/0063494 A1 | 3/2007 | Saito et al. |
| 2007/0095035 A1 | 5/2007 | Quioc |
| 2007/0222195 A1 | 9/2007 | Yabuta et al. |
| 2008/0118408 A1 | 5/2008 | Numoto et al. |
| 2010/0117344 A1 | 5/2010 | Windhausen et al. |

FOREIGN PATENT DOCUMENTS

| | | |
|---|---|---|
| DE | 10002799 A1 | 1/2001 |
| DE | 10 2007 052 828 A1 | 5/2008 |
| DE | WO 2009/043904 A2 | 4/2009 |
| DE | 102007033344 A1 | 5/2009 |
| EP | 0 012 626 A1 | 6/1980 |
| EP | 1 127 753 A1 | 8/2001 |
| EP | 1 671 856 A1 | 6/2006 |
| EP | 1 837 253 A1 | 9/2007 |
| FR | 2922007 A1 | 4/2009 |
| GB | 2 022 194 A | 12/1979 |
| JP | 5-213147 A | 8/1993 |
| JP | 3004037 U | 11/1994 |
| JP | 10-95302 A | 4/1998 |
| JP | 2000-198409 A | 7/2000 |
| JP | 2001-301561 A | 10/2001 |
| JP | 2005-53382 A | 3/2005 |
| JP | 2005-193762 A | 7/2005 |
| JP | 3122258 U | 6/2006 |
| JP | 3122259 U | 6/2006 |
| JP | 2007-15573 A | 1/2007 |
| JP | 2008-114718 A | 5/2008 |
| WO | WO 94/25315 A1 | 11/1994 |

OTHER PUBLICATIONS

Chinese Office Action issued in Chinese Patent Application No. 201080004389.7 on Nov. 23, 2012.

* cited by examiner (a)   (b)

GAS GENERATOR FOR RESTRAINING DEVICE OF VEHICLE

BACKGROUND OF THE INVENTION

1. Field of Invention

The present invention relates to a gas generator for a restraining device of a vehicle, such as an airbag apparatus.

2. Description of the Related Art

As a gas generator using a gas generating agent, there is known one in which an igniter is accommodated in a cylinder disposed in a central portion of a housing and the outside of the cylinder is a combustion chamber accommodating a gas generating agent. In such a gas generator, when the igniter is activated, a flame and the like are ejected from a hole formed in the cylinder to the combustion chamber, whereby the gas generating agent is ignited. At this moment, because the hole is formed above the igniter, the gas generating agent on the upper side of the combustion chamber is ignited and burnt by the flame, while the gas generating agent on the lower side is ignited and burnt by combustion of another gas generating agent. Therefore, the ignition property of the gas generating agent on the lower side is degraded.

JP-A No. 2005-53382 discloses a gas generator, wherein an inner cylindrical body 16 is disposed within a housing 3 formed by an initiator shell 1 and a closure shell 2, and a combustion chamber 5 is formed so as to surround the inner cylindrical body 16 and is filled with a gas generating agent 4. The inner cylindrical body 16 is disposed in a central portion of the housing 3, and an enhancer 17 and an igniter 18 are disposed therein.

U.S. Pat. No. 5,458,371 discloses an airbag inflator. A cylindrical member 120 is disposed inside a housing 102 formed by a diffuser cover 104 and base wall 106, the inside of the cylindrical member 120 is an ignition chamber 124, while the outside is a combustion chamber/filter chamber 132. A hole 130 communicating the both chambers with each other is formed with inclination on a circumferential wall surface of the cylindrical member 120. A combustion product generated from the ignition chamber 124 is discharged toward the lower side of the combustion chamber/filter chamber 132 (base wall 106 side).

SUMMARY OF THE INVENTION

The present invention provides a gas generator for a restraining device of a vehicle, including:

a housing formed by a cup-shaped closure shell, a cup-shaped diffuser shell having a plurality of gas discharge ports on a side surface portion thereof, and a flange portion having a hole for fixing;

a cup-shaped inner tube member disposed inside the housing, defining therein an ignition device chamber for accommodating an igniter coaxially with a central axis of the housing, and defining, in an outside thereof, a combustion chamber charged with a gas generating agent;

no filter for cooling and filtering a gas generated by combustion of the gas generating agent;

the cup-shaped inner tube member having a bottom surface located in a bottom plate side of the diffuser shell, an opening portion located in a bottom plate of the closure shell and a ventilating portion formed at an end portion of the opening portion, for allowing a combustion product generated in the ignition device chamber to pass therethrough;

the igniter attached to the closure shell such that the igniter projects inside from a hole formed in the bottom plate of the closure shell;

the cup-shaped inner tube member fixed to an igniter attaching portion which is a cylindrical portion projecting inwardly, and a passage for a combustion product formed between the cup-shaped inner tube member and the igniter attaching portion to reach the ventilating portion;

the combustion chamber having an outer circumferential surface formed by an outer circumference cylindrical member, an inner circumferential surface formed by the inner tube member, a bottom surface formed by the bottom plate of the closure shell and a top surface formed by a an annular porous member provided between the outer circumferential surface and the inner circumferential surface;

one end of an opening portion of the outer circumference cylindrical member located at the bottom plate of the closure shell;

the annular porous member having a plurality of holes and disposed such that a space is formed between the annular porous member and the bottom plate of the diffuser shell;

a gas discharge path formed between the outer circumference cylindrical member and a side surface of the diffuser shell; and the space and the gas discharge path being communicated with each other by a communicating portion formed on the other end of the opening portion of the outer circumference cylindrical member.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION OF THE INVENTION

Figure 1:
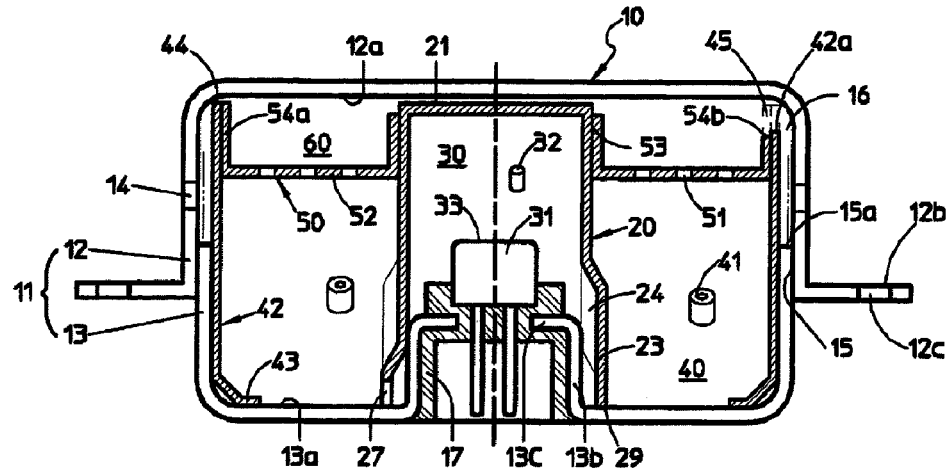
FIG. 1 shows an axial sectional view of a gas generator according to the present invention.

It is disclosed in JP-A No. 2005-53382 that a plurality of enhancer holes are formed in the inner cylindrical body 16 in the axial direction of the housing 3, but there is no enhancer hole on the igniter 18 side and a section lower than the igniter 18 (initiator shell 1 side). For this reason, the ignition property of the gas generating agent 4 existing in the initiator shell 1 side is not as good as that of the other gas generating agent 4, as described above.

As to showing of U.S. Pat. No. 5,458,371, it is difficult and troublesome to form the inclined hole on the circumferential wall surface of the curved cylindrical member 120. Further-more, when the cylindrical member 120 is thin, the hole 130 formed with inclination degrades an ejection-direction regulating function of the combustion product, whereby the ignition property remains problematic. However, a thicker cylindrical member 120 is not preferred in terms of weight reduction.

The present invention provides a gas generator for a restraining device of a vehicle, which is capable of improving the ignition property of the entire gas generating agent charged in a combustion chamber as well as reducing size and weight of the gas generator.

According to the gas generator of the present invention, the passage for the combustion product that reaches the ventilating portion is formed between the inner wall surface of the cup-shaped inner tube member and the outer circumferential surface of the igniter attaching portion, and, before activation, the inside of the inner tube member and the combustion chamber are communicated to each other.

At the time of the activation, a combustion product (flame, combustion gas, and the like) generated in the ignition device chamber is released from the ventilating portion to the bottom surface of the closure shell in the combustion chamber, whereby ignition of the gas generating agent within the combustion chamber is started from the bottom surface side of the closure shell, and ignition and combustion proceeds toward the bottom surface side of the diffuser shell, that is, from the bottom to the top. Therefore, the ignition property of the entire gas generating agent charged inside the combustion chamber can be enhanced. The igniter included in the ignition device is disposed coaxially with the central axis of the housing, contributing the ignition property of the gas generating agent.

When the cup-shaped inner tube member is press-fitted to the igniter attaching portion, the gas generator can be assembled easily without using conventional welding or the like. The cup-shaped inner tube member is fixed to the igniter attaching portion being a cylindrical portion projecting inward from the bottom plate of the closure shell.

The porous member forming the top surface of the combustion chamber defines a space in an upper portion of the combustion chamber. Moreover, the gas discharge path is formed between the outer circumference cylindrical member and the side surface portion of the diffuser shell, and the space and the gas discharge path are communicated with each other by the communicating portion formed in the end portion of the outer circumference cylindrical member in the diffuser shell side. Consequently, the combustion gas discharged from the combustion chamber passes through the space, the communicating portion, the gas discharge path and the gas discharge ports, whereby the combustion gas and the combustion residues thereof come into contact with and adhere to these wall surfaces. As a result, the function of filtering the combustion residues and the function of cooling the combustion gas are improved. Therefore, a conventionally used filter or coolant can be eliminated. As a result, the reduction in size and weight of the gas generator can be accomplished. The filter described here is a filter that is disposed around a gas generating agent and cools combustion gas of the gas generating agent and filters the combustion residues. Examples of such a filter include a filter that is disposed in the form of a cylinder around a gas generating agent (the one described in JP-A No. 2005-53382), and a filter that is disposed on a gas generating agent (the one described in U.S. Pat. No. 6,142, 515). The gas generator of the present invention does not have any of such filters.

The present invention preferably provides the gas generator for a restraining device of a vehicle, wherein the cup-shaped inner tube member has the opening portion and an enlarged diameter portion that is formed in the vicinity of the opening portion and has a diameter larger than that of other portion, an inner wall surface of the enlarged diameter portion has a groove formed in the axial direction, and an annular groove formed so as to communicate with an end portion on an opening portion side of the groove, and the passage for the combustion product that reaches the ventilating portion is formed by a combination of the groove and the annular groove and an outer circumferential surface of the igniter attaching portion.

The thickness of the cup-shaped inner tube member is uniform, and the inner diameter of the enlarged diameter portion similarly increases.

The groove formed in the axial direction may be formed only in a circumferential wall portion of the inner tube member, or may be formed from the circumferential wall portion to the enlarged diameter portion.

Because the passage for the combustion product is formed by a combination of the groove formed in the axial direction, the annular groove and the outer circumferential surface of the igniter attaching portion, the passage corresponding to the shape, depth and width of the grooves can be formed easily.

Although the number of grooves formed in the axial direction is one or two or more, it is preferred that two to eight of the grooves be formed with equal intervals.

The present invention preferably provides the gas generator for a restraining device of a vehicle, wherein an inner wall surface of the cup-shaped inner tube member has a protruding portion projecting inward, and the protruding portion abuts against the outer circumferential surface of the igniter attaching portion, and the passage for the combustion product that reaches the ventilating portion is formed by an inner wall surface of the inner tube member in the section where the projecting portion is not formed and the outer circumferential surface of the igniter attaching portion.

The protruding portion can be formed by deforming the outer wall surface of the inner tube member by pressing. Therefore, the formation of the protruding portion, fixation of the inner tube member to the igniter attaching portion, and formation of the passage for the combustion product can be carried out easily.

Because a gap is formed corresponding to the height of the protruding portion between the inner wall surface of the inner tube member and the circumferential surface of the igniter attaching portion, the passage of the combustion product can be formed easily. Although one or two or more protruding portions are formed, it is preferred that three to eight of the protruding portions be formed at equal intervals.

The present invention preferably provides the gas generator for a restraining device of a vehicle, wherein the igniter attaching portion has a base circumferential surface and a plurality of supporting portions that project from the base circumferential surface and are provided circumferentially at intervals to support the cup-shaped inner tube member in the radial direction and the axial direction, and the passage for the combustion product that reaches the ventilating portion is formed by the base circumferential surface when the inner wall surface and the opening portion of the cup-shaped inner tube member abuts against the plurality of supporting portions.

The supporting portions formed in the igniter attaching portion support the inner tube member in the radial direction and the axial direction, and the passage reaching the ventilating portion can be formed easily. It is preferred that two to four of the supporting portions be formed at equal intervals.

According to the present invention, a smaller and lighter gas generator in which the ignition property of the gas generating agent can be improved by the simple structure can be obtained.

The present invention can be used in a gas generator for a restraining device of a vehicle, such as an airbag apparatus mounted in various automobiles.

Figure 2:
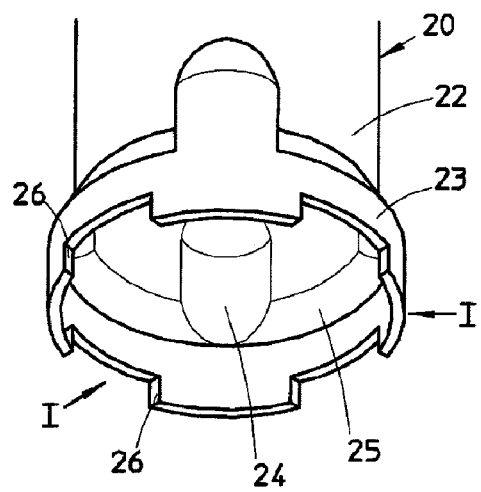
FIG. 2 shows a partially enlarged perspective view of an inner tube member used in FIG. 1.
Figure 3:
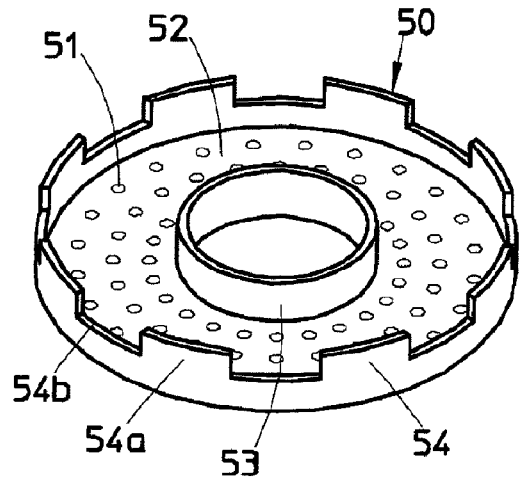
FIG. 3 shows a perspective view of a porous member used in FIG. 1.

Embodiments of Invention (1) Gas Generator Shown in FIG. 1 to FIG. 3

FIG. 1 shows a sectional view of a gas generator 10 in the axial direction. FIG. 2 shows a partially enlarged perspective view of the axial direction of an inner tube member used in the gas generator shown in FIG. 1, and the inner tube member in FIG. 1 is shown in a sectional view taken along the line I-I of FIG. 2 to make its shape clear. FIG. 3 shows a perspective view of a porous member used in FIG. 1.

A metallic housing 11 is obtained by welding and fixing a diffuser shell 12 and a closure shell 13 together at a contact portion. The diffuser shell 12 and the closure shell 13 is in the form of a cup having one end open. A flange portion 12b that has a hole 12c for fixing the housing to an airbag module (not shown) or the like is formed in an opening portion of the diffuser shell 12. As shown in FIG. 1, in the housing 11, the contact portion is welded and fixed (welded/fixed portion 15) such that the closure shell 13 is fitted inside the diffuser shell 12, and a step 15a shown in FIG. 1 is provided in an inner circumferential surface of the welded/fixed portion 15.

The diffuser shell 12 has a plurality of gas discharge ports 14 in its side surface portion, and the gas discharge ports 14 are sealed from the inside by an aluminum tape for prevention of moisture.

In the central part of a bottom plate 13a of the closure shell 13, an igniter attaching portion, that has a cylindrical portion 13b projecting toward an ignition device chamber 30 and an inward flange 13c extending inward from the cylindrical portion 13b. This attaching portion is formed integrally with the bottom surface 13a of the closure shell 13.

A cup-shaped inner tube member 20 is disposed in a central part of the housing 11. The inner tube member 20 is press-fitted to the igniter attaching portion such that a bottom surface 21 of the tube member is separated from a bottom plate (a top panel in the state shown in FIG. 1) 12a of the diffuser shell 12 and an opening portion 29 of the inner tube member abuts against the bottom plate 13a of the closure shell 13. Note that the bottom surface 21 may abut against the bottom plate (the top panel in the state shown in FIG. 1) 12a of the diffuser shell 12. The opening portion 29 may be fixed to the igniter attaching portion by crimping or the like.

The inner tube member 20 has a enlarged diameter portion 23 that is formed in the opening portion 29 and a circumferential wall portion 22 in the vicinity thereof and has an outer and inner diameters larger than other sections.

The inner wall surface extending from the circumferential wall portion 22 to the enlarged diameter portion 23 has a plurality of grooves (two grooves in FIG. 2) 24 formed in the axial direction, and an annular groove (annular curved surface) 25 is formed in an inner wall surface of the enlarged diameter portion 23 so as to communicate with end portions of the grooves 24, located on the opening portion 29 side.

As shown in FIG. 2, an opening portion of the enlarged diameter portion 23 (the opening portion of the inner tube member 20) has a plurality of cutout portions 26, and four ventilating portions 27 for allowing the combustion product to pass therethrough are formed by the cutout portions 26 and the bottom plate 13a of the closure shell.

The inside of the inner tube member 20 is the ignition device chamber 30 for accommodating an igniter 31 and a transfer charge (or a gas generating agent) 32. The gas generating agent can be used as the transfer charge.

The igniter 31 has an igniting portion 33 accommodating the ignition charge therein, and is integrally attached to the igniter attaching portion projecting into the ignition device chamber 30, by using a resin 17.

A cylindrical space outside the inner tube member 20 is a combustion chamber 40 filled with a gas generating agent 41.

An outer circumferential surface of the combustion chamber 40 is formed by an outer circumference cylindrical member 42 disposed within the cylindrical space, an inner circumferential surface by the inner tube member 20, and a bottom surface by the bottom plate 13a of the closure shell. An upper surface of the combustion chamber 40 is formed by providing an annular porous member 50, which has a plurality of holes 51, to an annular opening portion on the bottom plate 12a side of the diffuser shell between the outer circumferential surface and the inner circumferential surface of the combustion chamber.

An opening end portion 43 on one end side of the outer circumference cylindrical member 42 is in the form of an inward flange and abuts against the bottom plate 13a of the closure shell, while an opening portion 44 on the other end is disposed at a distance from the bottom plate 12a of the diffuser shell. A lower section on a circumferential wall of the outer circumference cylindrical member is in contact to an inner circumferential wall surface of the closure shell 13. Here, a cylindrical gas discharge path 16 is formed between an upper section of a circumferential wall of the outer circumference cylindrical member 42 and an inner circumferential wall surface of the diffuser shell 12 by the step 15a formed in the vicinity of the welded/fixed portion 15. A rim of the opening portion 44 of the outer circumference cylindrical member 42 has a cutout portion 42a (similar to the cutout portions 26 shown in FIG. 2, and a section in the opening portion 44 other than the cutout portions has no openings for directly communicating the combustion chamber 40 with the gas discharge path 16.

The annular porous member 50 has an annular bottom plate 52 having a large number of holes 51, an inside annular wall 53 formed at an inner circumferential rim of the annular bottom plate 52, and an outside annular wall 54 formed at an outer circumferential rim of the annular bottom plate 52.

Moreover, as shown in FIG. 1, the annular porous member 50 is fitted between the outer circumference cylindrical member 42 and the inner tube member 20, and an annular space 60 is defined by the annular porous member 50, the outer circumference cylindrical member 42, the inner tube member 20, and the bottom plate 12a of the diffuser shell.

The outside annular wall 54 is created by forming eight convex portions 54a and eight concave portions 54b alternately in the circumferential direction, and forms, together with the cutout portion 42a of the outer circumference cylindrical member 42, a communicating portion 45 communicating the annular space 60 and the gas discharge path 16 with each other. As shown in FIG. 1, when the annular porous member 50 is fitted between the outer circumference cylindrical member 42 and the inner tube member 20, the communicating portion 45 is formed by aligning the positions of the cutout portions 42a of the outer circumference cylindrical member 42 and the eight concave portions 54b.

An operation of the gas generator 10 shown in FIG. 1 to FIG. 3, when incorporated in a known airbag apparatus of a vehicle, is described next.

When the igniter 31 is activated, the transfer charge (or gas generating agent) 32 is ignited and burnt by a flame generated from the ignition portion 33, whereby the combustion product (flame, combustion gas, and the like) is generated.

The combustion product is released from the ventilating portions 27 in the vicinity of the bottom plate 13a of the closure shell within the combustion chamber 40 through the passage formed by the groove 24, the annular groove 25 of the inner tube member 20, and the outer circumference of the igniter attaching portion (cylindrical portion 13b) (the passage formed by the groove 24 and the annular groove 25). At the time of activation of the gas generator, in the case when the bottom plate 12a of the diffuser shell 12 is deformed into a convex shape by the pressure of the combustion gas generated in the combustion chamber 40 and the gap between the bottom surface 21 of the inner tube member 20 and the bottom plate 12a of the diffuser shell 12 is thereby further increased, the cross sectional area of the passage remains substantially constant even if the inner tube member 20 moves toward the bottom plate 12a of the diffuser shell 12, thus the performance of the gas generator does not change.

Because the combustion product is released to the vicinity of the bottom plate 13a of the closure shell in the manner described above, the ignition and combustion of the gas generating agent 41 charged inside the combustion chamber 40 proceeds from the bottom of FIG. 1 upward successively, whereby the ignition property of the entire gas generating agent 41 is improved.

Part of the combustion residues generated along with the gas generated from the gas generating agent 41 collide with the annular bottom plate 52 and the combustion residues adhere to and are held by the annular bottom plate 52 while passing through the holes 51 of the porous member 50.

The combustion residues, that have passed through the holes 51, then collide with the bottom plate 12a of the diffuser shell when flowing into the annular space 60, and adhere to and are held by the bottom plate 12a.

The combustion gas, that flows into the annular space 60, then collides with the outside annular wall 54 (the convex portions 54a and the concave portions 54b) of the porous member 50 while flowing out of the communicating portion 45, and the combustion residues adhere to and are held by the outside annular wall 54.

Thereafter, the combustion gas that has passed through the communicating portion 45 collide with the inner circumferential wall surface of the diffuser shell 12 opposing the communicating portion 45, whereby the combustion residues adhered to and are held by the inner circumferential wall surface.

Thereafter, the combustion gas passes through the gas discharge path 16, breaks the aluminum tape sealing the gas discharge ports 14, and is released from the gas discharge ports 14 to the inside of the airbag.

When the gas generating agent 41 within the combustion chamber 40 is burnt, the combustion gas repeatedly collides with a plurality of surfaces until being released from the gas discharge ports 14, and the combustion residues adhere to and are held by these surfaces. Thus, a filter for cooling and filtering the combustion gas is no longer necessary.

Figure 4:
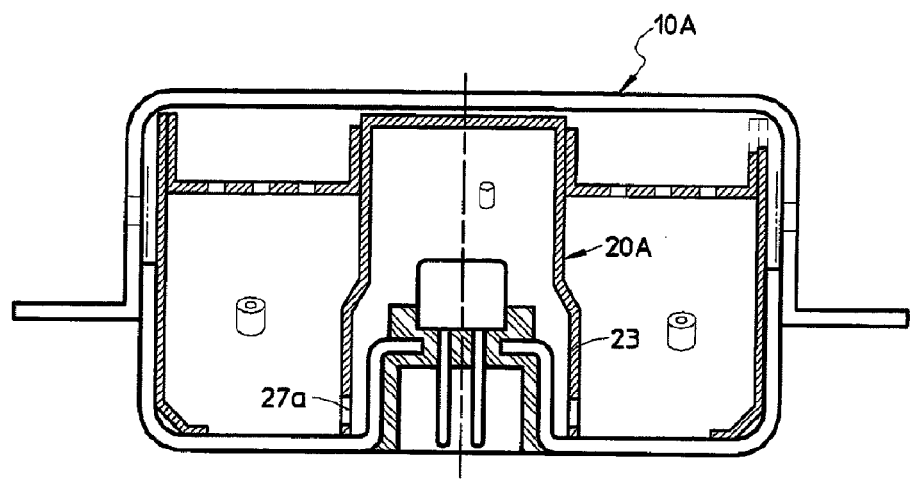
FIG. 4 shows an axial sectional view of a gas generator according to another embodiment.
Figure 5:
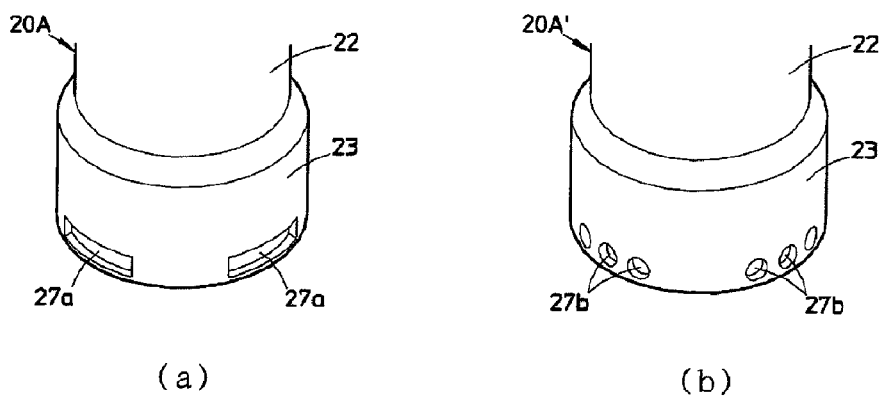
FIG. 5(a) shows a partial perspective view of an inner tube member used in FIG. 4.
FIG. 5(b) shows a partial perspective view of an inner tube member according to another embodiment.

(2) Gas Generator Shown in FIG. 4 and FIG. 5

FIG. 4 shows a sectional view of a gas generator 10A in the axial direction and the gas generator 10A is the same as the gas generator in FIG. 1, except that a cup-shaped inner tube member 20A is used. FIG. 5(a) is a partial perspective view of the inner tube member 20A used in the gas generator shown in FIG. 4, and FIG. 5(b) is a partial perspective view of an inner tube member 20A' of another embodiment.

The inner tube member 20A shown in FIG. 5(a) has an enlarged diameter portion 23 on a circumferential wall portion 22 at an opening portion. A total of four rectangular holes (ventilating portions) 27a are formed at equal intervals in the vicinity of an opening portion of the enlarged diameter portion 23.

The inner tube member 20A' shown in FIG. 5(b) has the enlarged diameter portion 23 on the circumferential wall portion 22 at the opening portion. A total of four groups (twelve holes in total) of circular holes (ventilating portions) 27b, where each group has three circular holes, are formed at equal intervals in the vicinity of the opening portion of the enlarged diameter portion 23.

The passage for the combustion product is formed between the enlarged diameter portion 23 of the inner tube members 20A and 20A', and the igniter attaching portion (cylindrical portion 13b).

Figure 6:
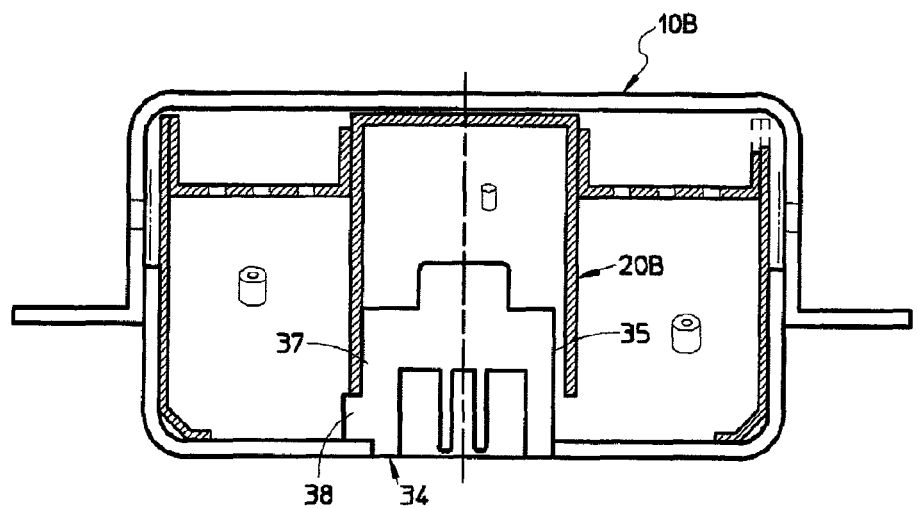
FIG. 6 shows an axial sectional view of a gas generator according to yet another embodiment.
Figure 7:
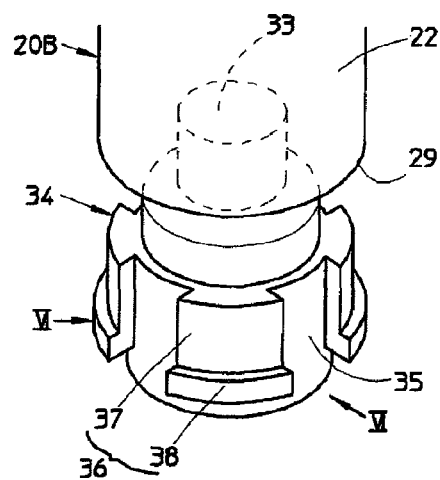
FIG. 7 shows a partially enlarged perspective view of an igniter and inner tube member used in FIG. 6.

(3) Gas Generator Shown in FIG. 6 and FIG. 7

FIG. 6 shows a sectional view of a gas generator 10B in the axial direction. The gas generator 10B is the same as the gas generator in FIG. 1, except that a cup-shaped inner tube member 20B is used and that a structure for fixing the igniter is different. FIG. 7 shows a partial perspective view of the igniter and the inner tube member 20B. However, FIG. 6 shows a cross-sectional view taken along the line VI-VI of FIG. 7 in order to illustrate the shape of the inner tube member 20B clearly.

The inner tube member 20B includes only a bottom surface and the circumferential wall surface 22 and has no enlarged diameter portion shown in FIG. 2 and FIG. 5.

The igniter attaching portion uses a metallic collar 34 that is a separate member from the closure shell 13, wherein the collar 34 has a base circumferential surface 35 and four supporting portions 36 for the inner tube member that are formed at equal intervals in the circumferential direction. The supporting portions 36 include a radial-direction supporting portion 37 and an axial-direction supporting portion 38. The collar 34 is fixed to the closure shell 13 by welding or the like.

As shown in FIG. 6, the inner tube member 20B is supported by the abutment between an inside surface of the circumferential wall surface 22 and the radial-direction supporting portion 37, and the abutment between the opening portion 29 of the inner tube member 20B and the axial-direction supporting portion 38.

Four passages are formed at equal spaces between the inner tube member 20B and the base circumferential surface 35 of the collar 34.

Figure 8:
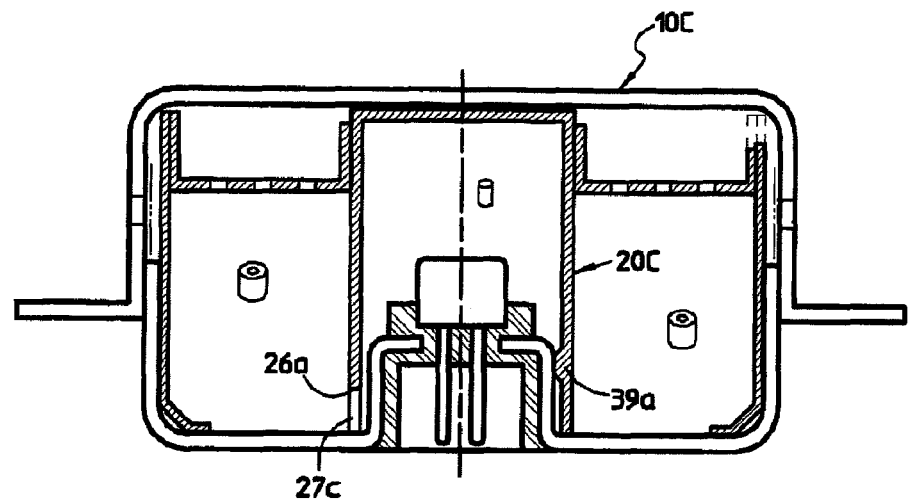
FIG. 8 shows an axial sectional view of a gas generator according to yet another embodiment.
Figure 9:
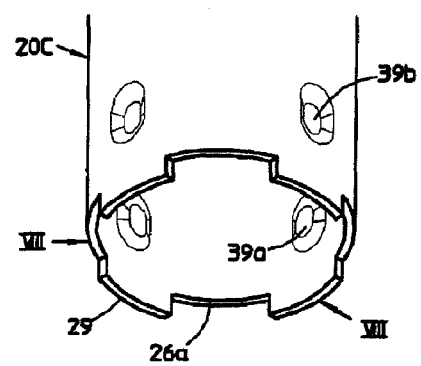
FIG. 9 shows a partially enlarged perspective view of an inner tube member used in FIG. 8.

(4) Gas Generator Shown in FIG. 8 and FIG. 9

FIG. 8 shows a sectional view of a gas generator 10C in the axial direction and the gas generator 10C is the same as the gas generator in FIG. 1, except that a cup-shaped inner tube member 20C is used. FIG. 9 shows a partially enlarged perspective view of the inner tube member 20C used in the gas generator shown in FIG. 8. However, FIG. 8 shows a cross-sectional view taken along the line VIII-VIII of FIG. 9 in order to illustrate the shape of the inner tube member 20C clearly.

The inner tube member 20C has four concave portions 39b that are formed, on the outer circumferential wall surface 22, at equal intervals in the circumferential direction at the opening portion 29. The four concave portions 39b are four convex portions 39a projected in the inner circumferential wall surface side.

The opening portion 29 of the inner tube member 20C has four cutout portions 26a, and four ventilating portions 27c for allowing the combustion product to pass therethrough are formed by the cutout portions 26a and the bottom plate 13a of the closure shell.

The passage is formed between the inner tube member 20C and the igniter attaching portion (cylindrical portion) 13b by the presence of the four convex portions 39a.

The invention thus described, it will be obvious that the same way may be varied in many ways. Such variations are not to be regarded as a departure from the spirit and scope of the invention, and all such modifications as would be obvious to one skilled in the art are intended to be included within the scope of the following claims.

The invention claimed is:

1. A gas generator for a restraining device of a vehicle, comprising:
   a housing formed by a cup-shaped closure shell, a cup-shaped diffuser shell having a plurality of gas discharge ports on a side surface portion thereof, and a flange portion having a hole for fixing the gas generator;
   a cup-shaped inner tube member disposed inside the housing, defining therein an ignition device chamber for accommodating an igniter coaxially with a central axis of the housing, and defining, in an outside thereof, a combustion chamber charged with a gas generating agent;
   the cup-shaped inner tube member having a bottom surface located adjacent to a bottom plate side of the diffuser shell, an opening portion located adjacent to a bottom plate of the closure shell and a first cutout portion formed at an end portion of the opening portion, for allowing a combustion product generated in the ignition device chamber to pass therethrough;
   the igniter attached to the closure shell such that the igniter projects inside from a hole formed in the bottom plate of the closure shell;
   the cup-shaped inner tube member fixed to an igniter attaching portion which is a cylindrical portion projecting inwardly, and a passage for a combustion product formed between the cup-shaped inner tube member and the igniter attaching portion to reach the first cutout portion;
   the combustion chamber having an outer circumferential surface formed by an outer circumference cylindrical member, an inner circumferential surface formed by the inner tube member, a bottom surface formed by the bottom plate of the closure shell, and a top surface formed by an annular porous member provided between the outer circumferential surface and the inner circumferential surface and including an annular bottom plate having a plurality of holes and an inside wall formed at an inner circumferential rim of the annular bottom plate;
   a gas discharge path formed between the outer circumference cylindrical member and a side surface of the diffuser shell;
   one end of an opening portion of the outer circumference cylindrical member being located at the bottom plate of the closure shell, a rim of the other end opening portion of the outer circumference cylindrical member having a second cutout portion for communicating the combustion chamber with the gas discharge path and a section having no openings; and
   the annular porous member disposed such that a space is formed between the annular porous member and the bottom plate of the diffuser shell;
   wherein no means for cooling and filtering a gas generated by combustion of the gas generating agent is provided other than the annular porous member.

2. The gas generator for a restraining device of a vehicle according to claim 1, wherein the cup-shaped inner tube member has the opening portion and an enlarged diameter portion that is formed in the vicinity of the opening portion and has a diameter larger than that of other portion,
   an inner wall surface of the enlarged diameter portion has a groove formed in the axial direction, and an annular groove formed so as to communicate with an end portion on an opening portion side of the groove, and
   the passage for the combustion product that reaches the first cutout portion is formed by a combination of the groove and the annular groove and an outer circumferential surface of the igniter attaching portion.

3. The gas generator for a restraining device of a vehicle according to claim 1,
   wherein an inner wall surface of the cup-shaped inner tube member has a protruding portion projecting inward, and the protruding portion abuts against the outer circumferential surface of the igniter attaching portion, and
   the passage for the combustion product that reaches the first cutout portion is formed by an inner wall surface of the inner tube member in the section where the projecting portion is not formed and the outer circumferential surface of the igniter attaching portion.

4. The gas generator for a restraining device of a vehicle according to claim 1,
   wherein the igniter attaching portion has a base circumferential surface and a plurality of supporting portions that project from the base circumferential surface and are provided circumferentially at intervals to support the cup-shaped inner tube member in the radial direction and the axial direction, and
   the passage for the combustion product that reaches the first cutout portion is formed by the base circumferential surface when the inner wall surface and the opening portion of the cup-shaped inner tube member abuts against the plurality of supporting portions.

* * * * *